United States Patent
Zhang et al.

(10) Patent No.: US 10,067,647 B2
(45) Date of Patent: Sep. 4, 2018

(54) INFORMATION PROCESSING METHOD AND DEFORMABLE ELECTRONIC DEVICE

(71) Applicant: Lenovo (Beijing) Limited, Beijing (CN)

(72) Inventors: Chao Zhang, Beijing (CN); Bo Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 176 days.

(21) Appl. No.: 14/553,304

(22) Filed: Nov. 25, 2014

(65) Prior Publication Data

US 2015/0316961 A1   Nov. 5, 2015

(30) Foreign Application Priority Data

Apr. 30, 2014   (CN) .......................... 2014 1 0183234

(51) Int. Cl.
*G06F 1/16*   (2006.01)
*G06F 3/0483*   (2013.01)

(52) U.S. Cl.
CPC .......... *G06F 3/0483* (2013.01); *G06F 1/1626* (2013.01); *G06F 1/1652* (2013.01); *G06F 1/1694* (2013.01); *G06F 2203/04102* (2013.01)

(58) Field of Classification Search
CPC .................................................. G06F 1/1652
See application file for complete search history.

(56) References Cited

U.S. PATENT DOCUMENTS

2013/0300686 A1*  11/2013  Yoon ....................... G06F 3/041
                                                      345/173
2014/0015743 A1*   1/2014  Seo ....................... G06F 3/0488
                                                      345/156

FOREIGN PATENT DOCUMENTS

CN        103197863 A        7/2013
CN        103297605 A        9/2013

OTHER PUBLICATIONS

"Chinese Application No. 201410183234.4, Office Action dated Sep. 1, 2017", w/ English Translation, (Sep. 1, 2017), 31 pgs.

* cited by examiner

*Primary Examiner* — Dennis Joseph
(74) *Attorney, Agent, or Firm* — Schwegman Lundberg & Woessner, P.A.

(57) ABSTRACT

The present disclosure discloses an information processing method and a deformable electronic device. The information processing method is applied in a deformable electronic device. The method comprises: acquiring a first deformation parameter corresponding to deformation of the electronic device when the first content is displayed on the display unit provided in the deformable electronic device; determining a control instruction based on the first deformation parameter; and displaying a second content on the display unit based on the control instruction, the first content being different from the second content.

14 Claims, 5 Drawing Sheets

INFORMATION PROCESSING METHOD AND DEFORMABLE ELECTRONIC DEVICE

PRIORITY APPLICATIONS

This application claims the benefit under 35 U.S.C. 119 to Chinese Application No. 201410183234.4, filed on 30 Apr. 2014; which application is incorporated herein by reference in its entirety.

TECHNICAL FIELD

The present disclosure relates to an electronic technology, and more particularly, to an information processing method and a deformable electronic device.

BACKGROUND

Currently, when it needs to adjust contents displayed on a display unit of an electronic device, a user needs to accurately touch a corresponding area on a touch display screen of the electronic device, or accurately click or press on a corresponding key or button on the electronic device with an operating body such as a finger, a stylus etc. Only when these operations are detected by the electronic device, the contents displayed on the display unit of the electronic device can be adjusted. Thus, as the user needs to spend time on accurately inputting an adjustment instruction in a corresponding area on the touch display screen of the electronic device or on accurately clicking or pressing on a corresponding key or button on the electronic device, it is not convenient to operate.

Thus, there is a technical problem that the adjustment manner is not convenient enough to adjust contents displayed on the display unit of the electronic device.

SUMMARY

Embodiments of the present disclosure provide an information processing method and a deformable electronic device, to solve the technical problem that the adjustment manner is not convenient enough to adjust contents displayed on a display unit of an electronic device.

In an aspect of the embodiments of the present disclosure, an information processing method applied in a deformable electronic device is provided, the method comprising:

acquiring a first deformation parameter corresponding to deformation of the electronic device when a first content is displayed on a display unit provided in the deformable electronic device;

determining a control instruction based on the first deformation parameter; and displaying a second content on the display unit based on the control instruction, the first content being different from the second content.

Alternatively, acquiring a first deformation parameter corresponding to deformation of the electronic device further comprises:

acquiring an angle parameter representing an angle between a first plane corresponding to the first part and a second plane corresponding to the second part when the deformation of the electronic device is a change in a relative position of a first part of the electronic device with respect to a second part of the electronic device.

Alternatively, acquiring a first deformation parameter corresponding to deformation of the electronic device further comprises:

acquiring a position parameter representing a relative position of the deformation with respect to the electronic device when the electronic device deforms.

Alternatively, the display unit is a deformable display unit which deforms in response to the deformation of the electronic device, and determining a control instruction based on the first deformation parameter further comprises:

determining a first control instruction for generating a first identification corresponding to the first content based on the first deformation parameter, and the first identification being used for locating the first content.

Alternatively, the display unit is a deformable display unit which forms in response to the deformation of the electronic device. Two windows associated with two respective applications are displayed on the display unit with at least a part of overlapped area between the two windows. When the two windows are displayed in a first manner, the content corresponding to the first window of the two windows is displayed in the overlapped area, and determining a control instruction based on the first deformation parameter further comprises:

determining a second control instruction for adjusting a display manner of the display unit from the first manner to a second manner based on the first deformation parameter, wherein when the two windows are displayed on the display unit in the second manner, the content corresponding to the second window of the two windows is displayed in the overlapped area.

Alternatively, determining a control instruction based on the first deformation parameter further comprises:

when the deformation of the electronic device is a change in an angle between a first plane corresponding to a first part of the electronic device and a second plane corresponding to a second part of the electronic device, determining a third control instruction for controlling the electronic device to display the second content on the display unit in the case that the first deformation parameter indicates that the change in the angle between the first plane and the second plane is larger than a first threshold.

Alternatively, the method further comprises, when displaying the second content on the display unit based on the third control instruction:

continuing to acquire a second deformation parameter corresponding to deformation of the electronic device; and determining a fourth control instruction for controlling the electronic device to display the first content on the display unit when the second deformation parameter indicates that the change in the angle between the first plane and the second plane changes from more than the first threshold to less than a second threshold.

Alternatively, the method further comprises, when displaying the second content on the display unit based on the third control instruction:

adjusting a display area of the display unit from a first display area to a second display area based on the third control instruction, wherein the second display area is matched with the deformation.

Alternatively, determining a control instruction based on the first deformation parameter further comprises:

determining the control instruction in the case that the first deformation parameter indicates that the change in the angle between the first plane and the second plane changes from more than a third threshold to less than a fourth threshold when the deformation of the electronic device is a change in an angle between a first plane corresponding to a first part of the electronic device and a second plane corresponding to a second part of the electronic device.

In another aspect of the embodiments of the present disclosure, a deformable electronic device is further provided, comprising:

a housing;

a display unit arranged on the housing;

a deformation parameter acquisition unit configured to acquire a first deformation parameter corresponding to deformation of the electronic device when first content is displayed on the display unit; and a processor arranged in the housing and connected to the display unit and the deformation parameter acquisition unit, configured to determine a control instruction based on the first deformation parameter, and display a second content on the display unit based on the control instruction, the first content being different from the second content.

Alternatively, the deformation parameter acquisition unit comprises an array of sensors, and the deformation parameter acquisition unit is further configured to when the deformation of the electronic device is a change in a relative position of a first part of the electronic device with respect to a second part of the electronic device, acquire an angle parameter representing an angle between a first plane corresponding to the first part and a second plane corresponding to the second part or a position parameter representing a relative position of the deformation with respect to the electronic device through the array of sensors while the electronic device deforms.

Alternatively, the display unit is a deformable display unit which forms in response to the deformation of the electronic device, and the processor is further configured to determine a first control instruction for generating a first identification corresponding to the first content based on the first deformation parameter, the first identification being used for locating the first content.

Alternatively, the display unit is a deformable display unit which forms in response to the deformation of the electronic device. Two windows associated with two respective applications are displayed on the display unit with at least a part of overlapped area between the two windows. When the two windows are displayed in a first manner, the content corresponding to the first window of the two windows is displayed in the overlapped area, and the processor is further configured to determine a second control instruction for adjusting a display manner of the display unit from the first manner to a second manner based on the first deformation parameter, wherein when the two windows are displayed on the display unit in the second manner, the content corresponding to the second window of the two windows is displayed in the overlapped area.

Alternatively, when the deformation of the electronic device is a change in an angle between a first plane corresponding to a first part of the electronic device and a second plane corresponding to a second part of the electronic device, and the first deformation parameter indicates that the change in the angle between the first plane and the second plane is larger than a first threshold, the processor is further configured to determine a first control instruction for controlling the electronic device to display the second content on the display unit based on the first deformation parameter.

Alternatively, the processor is further configured to continue to acquire, by the deformation parameter acquisition unit, a second deformation parameter corresponding to deformation of the electronic device when the second content is displayed on the display unit based on the first control instruction, and when the second deformation parameter indicates that the change in the angle between the first plane and the second plane changes from more than the first threshold to less than a second threshold, determine a second control instruction for controlling the electronic device to display the first content on the display unit.

Alternatively, the processor is further configured to adjust a display area of the display unit from a first display area to a second display area based on the first control instruction when the second content is displayed on the display unit based on the first control instruction, wherein the second display area is matched with the deformation.

Alternatively, the processor is further configured to adjust a display area of the display unit from a first display area to a second display area based on the control instruction when the second content is displayed on the display unit based on the control instruction, wherein the second display area is matched with the deformation.

Alternatively, the processor is further configured to determine a control instruction based on the first deformation parameter when the deformation of the electronic device is a change in an angle between a first part of the electronic device and a second part of the electronic device by determining the control instruction when the first deformation parameter indicates that the change in the angle between the first part and the second part changes from more than a third threshold to less than a fourth threshold.

According to the embodiments of the present disclosure, a first deformation parameter corresponding to deformation of a deformable electronic device is acquired when the first content is displayed on the display unit of the electronic device, a control instruction is determined based on the first deformation parameter, and the second content is displayed on the display unit based on the control instruction, and the first content is different from the second content. Thus the deformable electronic device can adjust the content displayed on the display unit according to the first deformation parameter corresponding to the deformation of the electronic device. The deformable electronic device can correspondingly adjust the contents displayed on the display unit only by acquiring a deformation parameter corresponding to deformation of the electronic device. The adjustment process is implemented according to the deformable characteristics of the electronic device, and at the same time, the deformable electronic device can conveniently deform under an operation of a user. Therefore, the adjustment manner of the information processing method according to an embodiment of the present disclosure simplifies the operation in the conventional adjustment manner.

DETAILED DESCRIPTION OF THE EMBODIMENTS

Embodiments of the present disclosure provide an information processing method and a deformable electronic device, to adjust the contents displayed on a display unit of an electronic device conveniently.

A general concept of the technical solutions according to the embodiments of the present disclosure is as follows.

An information processing method applied in an electronic device of the present disclosure is provided. The electronic device is a deformable electronic device and comprises a display unit, the method comprising:

acquiring a first deformation parameter corresponding to deformation of the electronic device when the first content is displayed on the display unit; determining a control instruction based on the first deformation parameter; and displaying the second content on the display unit based on the control instruction, the first content being different from the second content.

When the first content is displayed on the display unit of the electronic device, acquiring the first deformation parameter corresponding to deformation of a deformable electronic device, determining a control instruction based on the first deformation parameter, and displaying the second content on the display unit based on the control instruction, the first content being different from the second content. Therefore the deformable electronic device can adjust the contents displayed on the display unit according to the first deformation parameter corresponding to the deformation of the electronic device. The deformable electronic device can correspondingly adjust the contents displayed on the display unit only by acquiring a deformation parameter corresponding to deformation of the electronic device.

For better understanding the above technical solutions, the above technical solutions will be described in detail below in combination with accompanying drawings of the description and specific embodiments.

Figure 1:
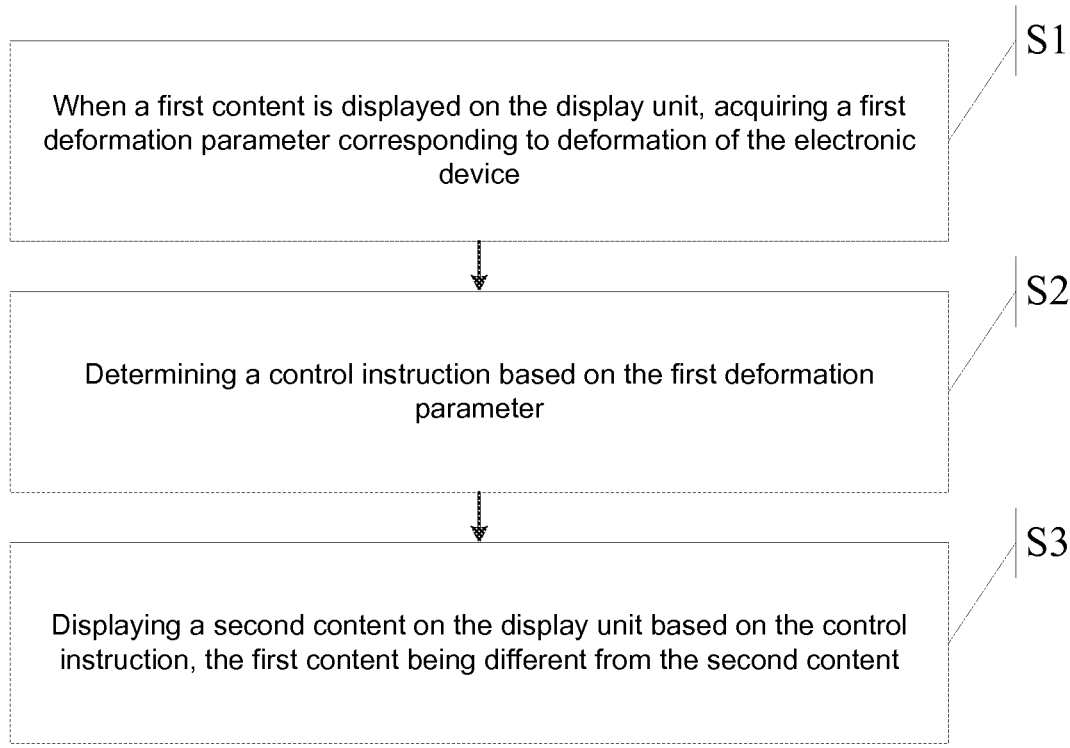
FIG. 1 is a flowchart of an information processing method according to an embodiment of the present disclosure.

With reference to FIG. 1, illustrated is a flowchart of an information processing method according to an embodiment of the present disclosure. As shown in FIG. 1, the method may comprise:

S1: when a first content is displayed on the display unit, acquiring a first deformation parameter corresponding to deformation of the electronic device;

S2: determining a control instruction based on the first deformation parameter; and S3: displaying a second content on the display unit based on the control instruction, the first content being different from the second content.

In the following, specific implementations of the information processing method illustrated in FIG. 1 will be described respectively by way of embodiments.

First Embodiment

In the present embodiment, the information processing method according to an embodiment of the present disclosure will be described in detail by taking a deformable smart phone as the deformable electronic device and a content on page 100 of an electronic book <X> as the first content.

Figure 2:
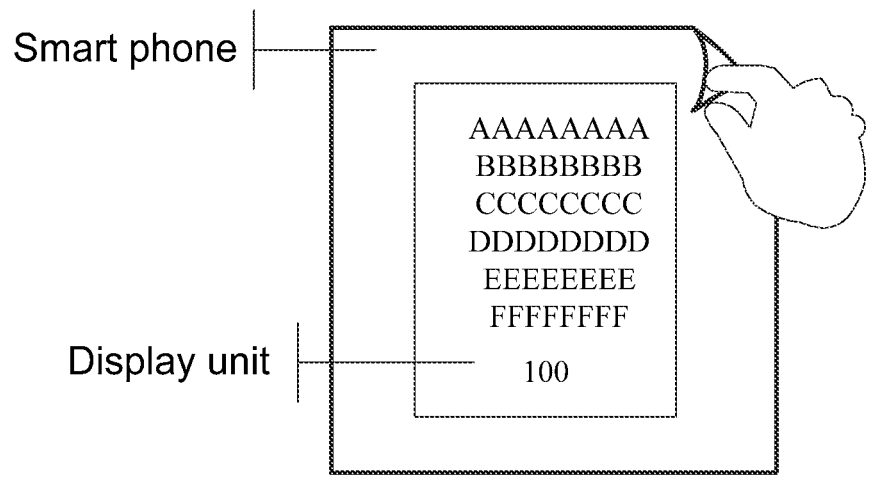
FIG. 2 is a diagram of deformation of an electronic device according to an embodiment of the present disclosure.

With reference to FIG. 2 which illustrates a diagram of deformation of an electronic device according to an embodiment of the present disclosure, the content on page 100 of the electronic book <X> is displayed on a display unit of the smart phone, and an upper right area of the smart phone deforms under an operation of a user's hand.

In step S1, when the deformation of the smart phone is a change in a relative position of a first part with respect to a second part, a first deformation parameter corresponding to deformation of the electronic device is acquired. In the present embodiment, also with reference to FIG. 2, the first part is an un-deformed part of the smart phone, and the second part is a deformed part under the operation of the user's hand. Specifically, an angle parameter identifying an angle between a first plane corresponding to the first part and a second plane corresponding to the second part may be acquired.

Figure 3:
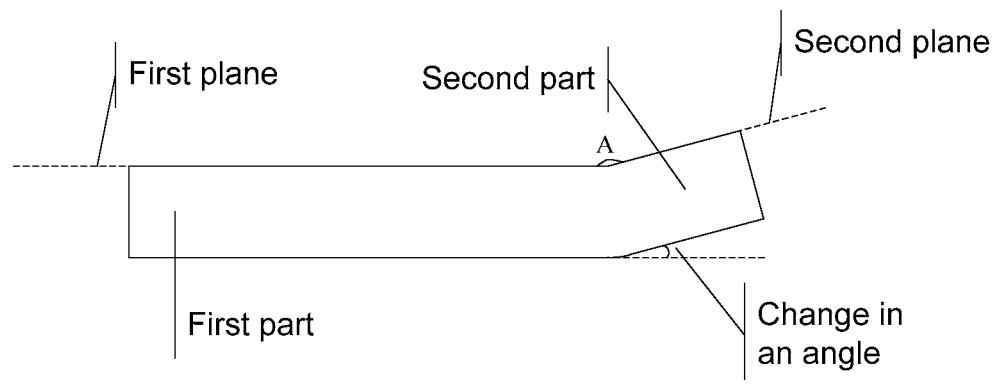
FIG. 3 is a side view of deformation of a smart phone according to an embodiment of the present disclosure.

With reference to FIG. 3, illustrated is a side view of deformation of a smart phone according to an embodiment of the present disclosure. As shown in FIG. 3, an angle parameter between a first plane corresponding to the first part and a second plane corresponding to the second part is <A.

In a specific implementation, in addition to the angle parameter representing an angle between a first plane corresponding to the first part and a second plane corresponding to the second part, the first deformation parameter corresponding to deformation of the electronic device may be a position parameter representing a relative position of the deformation with respect to the electronic device when the electronic device deforms.

For example, also with reference to FIG. 2, a position parameter representing a relative position of the deformation with respect to the smart phone when the smart phone deforms is illustrated. In the present embodiment, the acquired position parameter may indicate that when the smart phone is placed face up, the position where the smart phone deforms is located on the upper right of the smart phone.

In a specific implementation, the display unit of the smart phone may be a deformable display unit. When the smart phone deforms, if the position where the smart phone deforms will influence the display operation of the display unit, the display unit will also deform accordingly.

Figure 4:
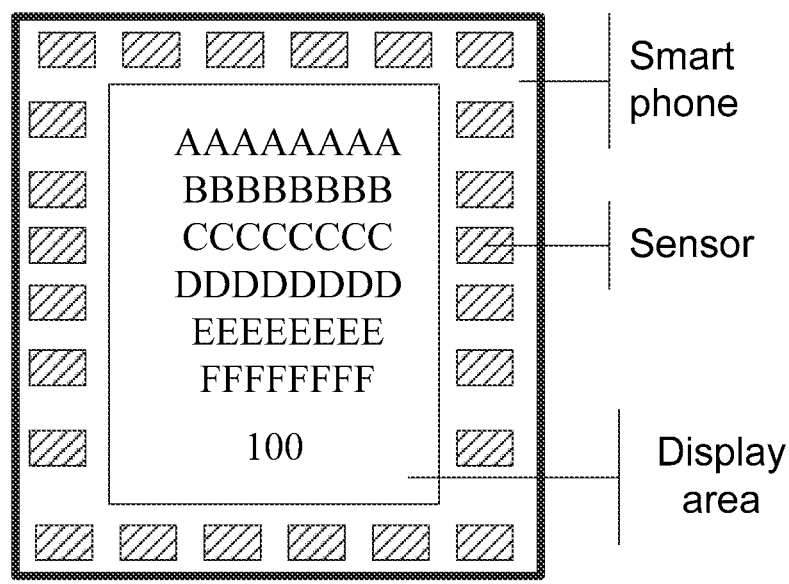
FIG. 4 is a diagram of an array of sensors arranged on a smart phone according to an embodiment of the present disclosure.

In a specific implementation, the angle parameter or position parameter described above may be acquired through an array of sensors. For example, with reference to FIG. 4, illustrated is a diagram of an array of sensors arranged on a smart phone according to an embodiment of the present disclosure. As shown in FIG. 4, multiple sensors may be arranged on the smart phone to form an array of sensors. When the smart phone deforms, a sensor in a position where the deformation occurs can acquire corresponding deformation information. In an example, the sensor may specifically be a pressure sensor or a pressure fibrous body. When the deformation occurs in a certain position, the smart phone can acquire pressure information of a corresponding position through a pressure sensor or a pressure fibrous body in the position where the deformation occurs. The pressure sensor or the pressure fibrous body can generate corresponding pressure information based on a squash or stretches applied at the deformation position and in turn obtain a corresponding angle parameter or position parameter according to the acquired pressure information.

Two forms of the first deformation parameter are described above. Based on the description of the present embodiment, those skilled in the art can set the first deformation parameter in another suitable form according to practical conditions to meet requirements of the practical conditions. The description thereof will be omitted here.

When acquiring the first deformation parameter in step S1, the information processing method according to an embodiment of the present disclosure proceeds to step S2, i.e., determining a control instruction based on the first deformation parameter.

In the present embodiment, a first control instruction for generating a first identification corresponding to the first content may be determined based on the first deformation parameter, and the first identification is used for locating the first content.

Specifically, when it is detected that the smart phone deforms, a first control instruction for generating a first identification corresponding to the contents on page 100 of the electronic book <X> displayed on the display unit is determined. The first identification is similar to a label, and can rapidly locate the contents on page 100 in the electronic book <X>. In an example, when a user reopens the electronic book <X>, contents on page 1 of the electronic book <X> are displayed on the display screen of the smart phone, and at the same time, a first identification is also displayed on the display unit. If the smart phone receives a click operation or a touch operation on an area corresponding to the first identification from a user, the smart phone can rapidly adjust the contents on page 1 of the electronic book <X> which are displayed currently to the contents on page 100 for convenience of view by the user.

Of course, when the first content displayed on the display unit of the smart phone are the contents on page 100 of the electronic book <X>, the first control instruction determined based on the first deformation parameter may also be used for controlling the smart phone to switch the contents on page 100 of the electronic book <X> which are displayed currently to the contents on page 101, and so on. Of course, based on the description of the present embodiment, those skilled in the art can set the first control instruction determined based on the first deformation parameter to be able to suitably process the contents on page 100 of the electronic book <X> in another way according to practical conditions. The description thereof will be omitted here.

In a specific implementation, in order to ensure that the first deformation parameter acquired in step S1 is generated due to deformation resulting from a user's control of the smart phone for adjusting the first content displayed on the display unit of the smart phone, instead of being generated due to deformation resulting from a user's mis-operation of the smart phone in the process of using the smart phone, a third control instruction for controlling the electronic device is determined to display the second content on the display unit when the first deformation parameter indicates that the change in the angle between the first plane and the second plane is larger than a first threshold, also as shown in FIG. 3. The first threshold may be 30°, 45° etc., which is not limited.

In an example, by taking the contents on page 100 of the electronic book <X> as the first content, when a change in an angle between a first plane corresponding to a first part where the smart phone deforms and a second screen corresponding to a second part is larger than a first threshold, a control instruction (which may be the first control instruction or the third control instruction) is determined based on the first deformation parameter. The control instruction may be used for generating a first identification corresponding to the first content, so as to quickly locate the contents corresponding to page 100 when the electronic book <X> is reopened, or the control instruction may also be used for switching the contents on page 100 of the electronic book <X> to the contents on page 101 of the electronic book <X>. The description thereof will be omitted here.

In addition to determining a control instruction when the first deformation parameter indicates that the change in the angle between the first plane and the second plane is larger than the first threshold, the control instruction (which may be the first control instruction or the third control instruction) may also be determined when the first deformation parameter indicates a position where the smart phone deforms is consistent with a predefined position, i.e., the position parameter indicates that position where the smart phone deforms is consistent with the predefined position. Similarly, the control instruction may be used for generating a first identification corresponding to the first content, so as to quickly locate the contents corresponding to page 100 when the electronic book <X> is reopened, or the control instruction may also be used for switching the contents on page 100 of the electronic book <X> to the contents on page 101 of the electronic book <X>. The description thereof will be omitted here.

In a specific implementation, the smart phone may also determine, based on the position parameter, a control instruction for controlling the smart phone to switch the first content displayed on the display unit to previous content associated with the first content or next content associated with the first content. It should be noted that the previous content associated with the first content, the first content, and the next content associated with the first content may belong to the same set of content, such as the same book or the same book catalogue etc. In an example, when the first deformation parameter indicates that the position where the display unit of the smart phone deforms is on the left of the display unit, the first control instruction determined based on the first deformation parameter may be used for controlling the smart phone to switch the contents on page 100 of the electronic book <X> which are displayed currently to contents on page 99, and when the first deformation parameter indicates that the position where the display unit of the smart phone deforms is on the right of the display unit, the first control instruction determined based on the first deformation parameter may be used for controlling the smart phone to switch the contents on page 100 of the electronic book <X> which are displayed currently to contents on page 101. Alternatively, when the first deformation parameter indicates that the position where the display unit of the smart phone deforms is on the left of the display unit, the first control instruction determined based on the first deformation parameter may be used for controlling the smart phone to switch the electronic book <X> which is displayed currently to a previous book <W> in a certain book catalogue, and when the first deformation parameter indicates that the position where the display unit of the smart phone deforms is on the right of the display unit, the first control instruction determined based on the first deformation parameter may be used for controlling the smart phone to switch the electronic book <X> which is displayed currently to a next book <Y> in a certain book catalogue, and so on. The description thereof will be omitted here.

In a specific implementation, with the description of the present embodiment, those skilled in the art can combine the angle parameter with the position parameter according to practical conditions, so as to meet requirements of the practical conditions. In an example, the control instruction is determined only if the first deformation parameter indicates that the change in the angle between the first plane and the second plane is larger than the first threshold and the position where the smart phone deforms is consistent with the predefined position. The description thereof will be omitted here.

When determining the control instruction in step S2, the information processing method according to an embodiment of the present disclosure proceeds to step S3, i.e., displaying the second content on the display unit based on the control instruction, and the second content is different from the first content.

In the present embodiment, when the control instruction determined in step S2 is used for generating a first identification corresponding to the first content, "identification is added successfully" may be displayed on the display unit of the smart phone, or a particular pattern corresponding to the first identification may be added in the contents on page 100 of the electronic book <X>. Based on the description of the present embodiment, those skilled in the art can understand that other suitable contents may be displayed on the display unit of the smart phone according to practical conditions when the control instruction is used for generating a first identification corresponding to the first content. The description thereof will be omitted here.

When the control instruction determined in step S2 is used for switching the contents on page 100 of the electronic book <X> which are displayed currently to the contents on page 101, the contents on page 101 of the electronic book <X> may be displayed on the display unit of the smart phone at this time. The description thereof will be omitted here.

In a specific implementation, also with reference to FIG. 3, as an angle between a first plane corresponding to a first part and a second screen corresponding to a second part when the smart phone deforms is larger than a first threshold, when the position where the smart phone deforms influences the display unit of the smart phone, in order not to influence the contents displayed on the display unit viewed by a user, the information processing method according to an embodiment of the present disclosure further comprises adjusting a display area of the display unit from a first display area to a second display area based on the control instruction determined in step S2, wherein the second display area is matched with the deformation.

In a specific implementation, assuming that the first plane corresponding to the first part and the second plane corresponding to the second part belong to the same plane before the smart phone deforms, if the first plane where the first part is located is approximately the same plane as the second plane where the second part is located when the smart phone deforms, i.e., when the smart phone deforms, a change in an angle between the first plane and the second plane is small, there is also a small influence on a user when a display area located on the second part is normally used for display. Therefore, in a specific implementation, when the change in the angle between the first plane and the second plane is larger than a first value such as 60°, 90° etc., the display area located on the second part is triggered to stop being used for display, so that the second display area when the display unit is adjusted is matched with the deformation of the smart phone. The description thereof will be omitted here.

Figure 5A:
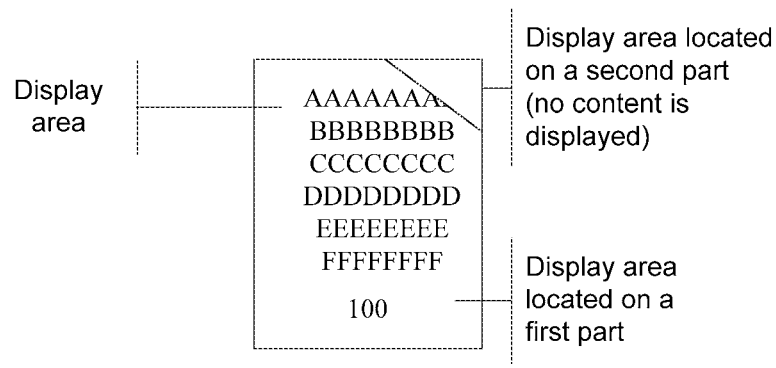
FIG. 5A is a diagram of adjustment of a display area of a display unit of a smart phone in a first case according to an embodiment of the present disclosure.
Figure 5B:
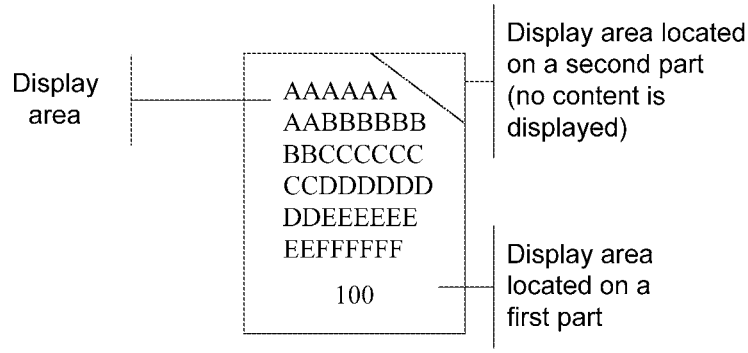
FIG. 5B is a diagram of adjustment of contents displayed in a display area originally located on a second part to be displayed in a display area originally located on a first part in the first case according to an embodiment of the present disclosure.

In an example, with reference to FIG. 5A, illustrated is a diagram of adjustment of a display area of a display unit of a smart phone in a first case according to an embodiment of the present disclosure. As shown in FIG. 5A, when the smart phone deforms, if the position where the smart phone deforms influences the display unit of the smart phone, i.e., there is a part of the display area of the display unit in the second part, when the smart phone deforms, the display will be stopped in a display area of the display unit located on the second part. Preferably, at this time, the content displayed in the display area originally located on the second part will be correspondingly adjusted to be displayed in a display area located on the first part. For example, with reference to FIG. 5B, illustrated is a diagram of adjustment of content displayed in a display area originally located on a second part to be displayed in a display area originally located on a first part in the first case. As shown in FIG. 5B, the contents displayed in the display area originally located on the second part in FIG. 5A are adjusted to be displayed in the display area located on the first part. Further, also with reference to FIG. 5B, in order to ensure integrity of the first content viewed by a user, all display contents located on the second part are adjusted to be displayed on the first part. In an example, if a part of a word, a character, or a picture is located on the display area of the second part, it will be adjusted to be displayed in the display area of the first part. Of course, in practical applications, if there is a small proportion of a certain word or picture located in the display area of the second part, for example, the size of the word or picture in the display area of the second part is only 1% of the whole word or picture, the word or picture may not be adjusted.

It can be seen from both FIGS. 5A and 5B that in the first case, the first display area is the whole display screen of the smart phone, and the second display area is an area of the display screen except for the display area of the second part. The display area of the second part is a display area from the position where the display unit of the smart phone deforms to a corner to which the position is closest.

Further, when the change in the angle between the first plane and the second plane is large due to deformation of the smart phone, for example, the angle between the first plane and the second plane is large so that the second part may cover a part of the display area located on the first part. Therefore, in this case, the display of the contents may be stopped at the same time in the display area located on the second part and the display area located on the first part and cover by the second part, so that the adjusted second display area is matched with the deformation of the smart phone. The description thereof will be omitted here.

Figure 5C:
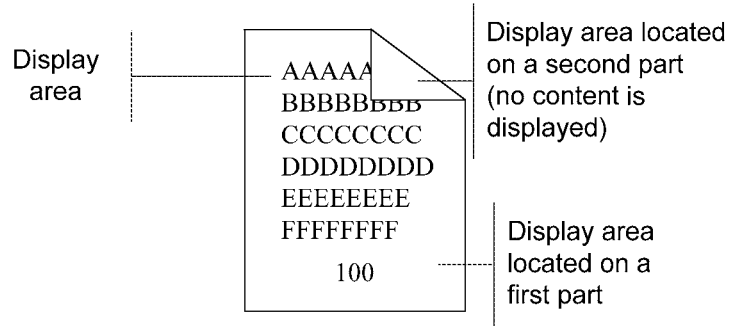
FIG. 5C is a diagram of adjustment of a display area of a display unit of a smart phone in a second case according to an embodiment of the present disclosure.
Figure 5D:
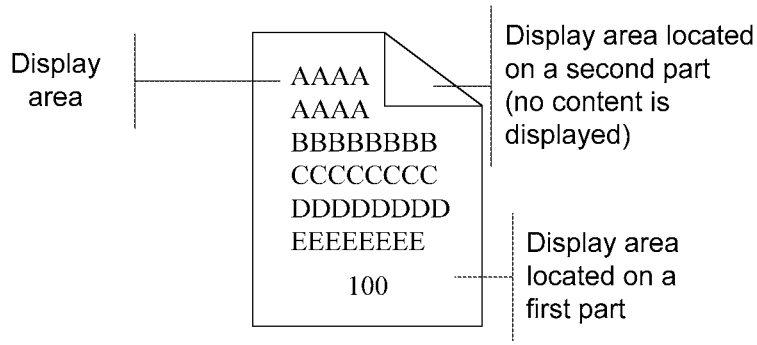
FIG. 5D is a diagram of adjustment of contents displayed in a display area originally located on a second part and contents displayed on a first part and covered by the second part to be displayed in a display area originally located on the first part in the second case according to an embodiment of the present disclosure.

For example, with reference to FIG. 5C, illustrated is a diagram of adjustment of a display area of a display unit of a smart phone in a second case according to an embodiment of the present disclosure. As shown in FIG. 5B, display is stopped in the display area located on the second part on the display unit of the smart phone, and at the same time, display is also stopped in a part of the display area located on the first part which is covered by the second part. In order to ensure integrity of the first content viewed by a user, it needs to adjust the contents displayed in the display area located on the second part and the contents on the display area of the first part which are covered by the second part to be displayed in other area of the first part. Also with reference to FIG. 5D, illustrated is a diagram of adjustment of contents displayed in a display area originally located on a second part and contents displayed on a first part and covered by the second part to be displayed in a display area originally located on the first part in the second case according to an embodiment of the present disclosure. The adjustment manner is the same as that in FIG. 5B, and the description thereof will be omitted here. It should be noted that characters "F" in FIG. 5D have been adjusted to be displayed on page 101. A row of the contents on page 101 will also be correspondingly adjusted to be displayed on a next page.

It can be seen from both FIGS. 5C and 5D that in the second case, the first display area is the whole display screen of the smart phone, and the second display area is a display area on the display screen except for the display area of the second part and the display area on the first part covered by the second part. The display area on the first part covered by the second part and the second part are centrally symmetric.

In a specific implementation, when the second content is displayed on the display unit based on the third control instruction determined when the first deformation parameter indicates that the change in the angle between the first plane and the second plane is larger than the first threshold, the method according to an embodiment of the present disclosure further comprises continuing to acquire a second deformation parameter corresponding to deformation of the electronic device due to the deformation; and when the second deformation parameter indicates that the change in the angle between the first plane and the second plane changes from more than the first threshold to less than a second threshold, determining a fourth control instruction for controlling the electronic device to display the first content on the display unit.

Specifically, also with reference to FIG. 3, when the second content is displayed on the display unit, if the second deformation parameter acquired by the smart phone indicates that the change in the angle between the first plane and the second plane changes from more than the first threshold to less than the second threshold, a fourth control instruction used for controlling the smart phone to switch the second content displayed on the display unit to the first content is determined. In an example, when the contents on page 101 of the electronic book <X> are displayed on the display unit, the fourth control instruction determined may be used to switch the contents on page 101 of the electronic book <X> to the contents on page 100 of the electronic book <X>. The first threshold may be the same as or different from the second threshold. Those skilled in the art can set the first threshold and the second threshold as suitable values according to practical conditions, so as to meet requirements of the practical conditions. The description thereof will be omitted here.

In a specific implementation, in order to further confirm that first deformation parameter is generated due to deformation resulting from a user's control of the smart phone for adjusting the first content displayed on the display unit of the smart phone, when the first deformation parameter indicates that the change in the angle between the first plane and the second plane is larger than the first threshold, it may further be detected that whether the change in the angle between the first plane and the second plane is larger than the first threshold for more than a first preset value which may be 2 seconds, 3 seconds and the like. If the change in the angle between the first plane and the second plane is larger than the first threshold for more than the first preset value, the smart phone will adjust the first content displayed on the display unit to the second content according to the control instruction determined based on the first deformation parameter, and even if a second deformation parameter acquired by the smart phone indicates that the change in the angle between the first plane and the second plane changes from more than the first threshold to less than a second threshold, the smart phone will not determine to switch the second content displayed on the display unit to the first content according to the control instruction; and if the change in the angle between the first plane and the second plane is larger than the first threshold for less than the first preset value, the smart phone will adjust the first content displayed on the display unit to the second content according to the control instruction determined based on the first deformation parameter, and when the second deformation parameter acquired by the smart phone indicates that the change in the angle between the first plane and the second plane changes from more than the first threshold to less than a second threshold, the smart phone will determine to switch the second content displayed on the display unit to the first content according to the control instruction.

For example, by taking the content on page 100 of the electronic book <X> as the first content, the content on page 101 of the electronic book <X> as the second content, and 2 seconds as the first preset value as an example, when the change in the angle between the first plane and the second plane is larger than the first threshold for more than 2 seconds, the smart phone will switch the contents on page 100 of the electronic book <X> currently displayed on the display unit to the contents on page 101 of the electronic book <X> according to the control instruction determined based on the first deformation parameter. Then, even if the change in the angle between the first plane and the second plane changes from more than the first threshold to less than the second threshold, it is not adjust the contents on page 101 of the electronic book <X> displayed on the display unit, since the change in the angle between the first plane and the second plane is larger than the first threshold for more than 2 seconds, which indicates that a user desires to keep the second content displayed on the display unit unadjusted. When the change in the angle between the first plane and the second plane is larger than the first threshold for less than 2 seconds, the smart phone will switch the contents on page 100 of the electronic book <X> currently displayed on the display unit to the contents on page 101 of the electronic book <X> according to the control instruction determined based on the first deformation parameter. Then, if the change in the angle between the first plane and the second plane changes from more than the first threshold to less than the second threshold, the smart phone will switch the contents on page 101 of the electronic book <X> displayed on the display unit to the contents on page 100 of the electronic book <X>, since the change in the angle between the first plane and the second plane is larger than the first threshold for less than 2 seconds, which indicates that the deformation may be a mis-operation at this time, or a user does not desire to keep the contents displayed on the display unit to be the contents on page 101 of the electronic book <X>.

In a specific implementation, when the deformation of the electronic device is a change in an angle between a first plane corresponding to a first part of the electronic device and a second plane corresponding to a second part of the electronic device, determining a first control instruction based on the first deformation parameter in step S2 may further be: when the first deformation parameter indicates that the change in the angle between the first plane and the second plane changes from more than a third threshold to less than a fourth threshold, determining the control instruction. The third threshold may be larger than the fourth threshold.

In an example, also with reference to FIGS. 2 and 3, when the first deformation parameter indicates that the smart phone is returned to a state before the deformation from a deformed state (the change in the angle between the first plane and the second plane is larger than the third threshold), i.e., as shown in FIGS. 2 and 3, a user bends the smart phone on the upper right and then recovers the smart phone, the smart phone determines, according to the acquired first deformation parameter, a control instruction which may be used for controlling the electronic device to adjust the first content displayed on the display unit to the second content. That is, only if it is determined that the deformation of the smart phone is from being bent to being recovered (unbent), the smart phone adjusts the contents on page 100 of the electronic book <X> displayed on the display unit to the contents on page 101. The description thereof will be omitted here.

According to the embodiment described above, a first deformation parameter corresponding to deformation of a deformable electronic device is acquired when the first content is displayed on the display unit of the electronic device, a control instruction is determined based on the first deformation parameter, and the second content is displayed on the display unit based on the control instruction, the first content is different from the second content. Therefore the deformable electronic device can adjust the contents displayed on the display unit according to the first deformation parameter due to the deformation of the electronic device. The deformable electronic device can correspondingly adjust the contents displayed on the display unit only by acquiring a deformation parameter corresponding to deformation of the electronic device.

Second Embodiment

In the present embodiment, an information processing method according to an embodiment of the present disclosure will be described in detail below by still taking a deformable tablet as the deformable electronic device.

In the present embodiment, a display unit of the smart phone is a deformable display unit, and the display unit deforms in response to the deformation of the smart phone. Two windows corresponding to two respective applications are displayed on the display unit. There is at least a part of overlapped area between the two windows, and when the two windows are displayed in a first manner, contents corresponding to the first window of the two windows are displayed in the overlapped area.

Figure 6A:
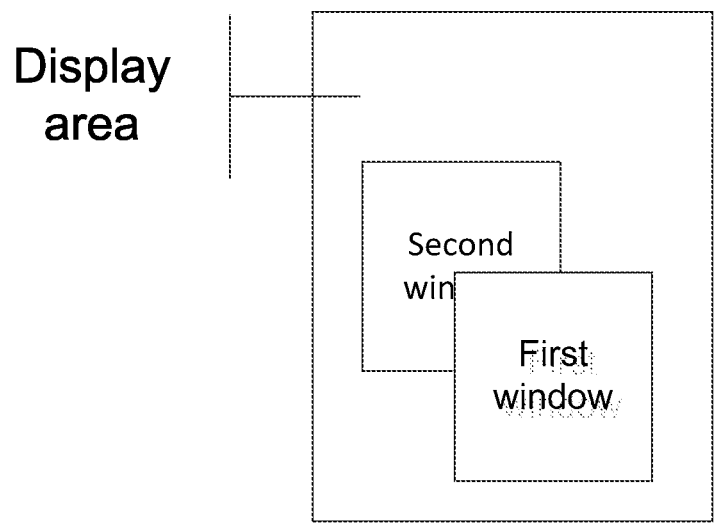
FIG. 6A is a diagram of display of two windows on a display unit in a first manner according to an embodiment of the present disclosure.

With reference to FIG. 6A, illustrated is a diagram of display of two windows on a display unit in a first manner according to an embodiment of the present disclosure. As shown in FIG. 6A, there is a part of overlapped area between the first window and the second window, and when the two windows are displayed in a first manner, the contents corresponding to the first window are displayed in the overlapped area.

In step S1, a first deformation parameter corresponding to deformation of the electronic device is acquired. Specifically, similar to the process described in the first embodiment, the first deformation parameter may be acquired by an array of sensors. As acquisition of the first deformation parameter through the array of sensors and specific forms of the first deformation parameter have been described in the first embodiment, for clarity of the specification, the description thereof will be omitted.

After the first deformation parameter is acquired in step S1, the information processing method according to an embodiment of the present disclosure proceeds to step S2, i.e., determining a control instruction based on the first deformation parameter.

In step S2, specifically, a second control instruction for adjusting a display manner of a display unit from a first manner to a second manner may be determined based on the first deformation parameter. When two windows are displayed on the display unit in the second manner, contents corresponding to the second window of the two windows are displayed in the overlapped area. That is, the second window is switched to be a window displayed on the top of the display unit of the smart phone. Of course, a focus window of the smart phone may also be determined as the second window. The focus window is a window displayed on the display unit of the smart phone, which can receive instructions input through input apparatuses such as a keyboard, a mouse etc.

A specific process of determining the second control instruction based on the first deformation parameter is similar to the process of determining the control instruction based on the first deformation parameter described in the first embodiment, the description thereof will be omitted.

After the control instruction is determined in step S2, the information processing method according to an embodiment of the present disclosure proceeds to step S3, i.e., displaying a second content on the display unit of the smart phone based on the control instruction, the first content being different from the second content.

Figure 6B:
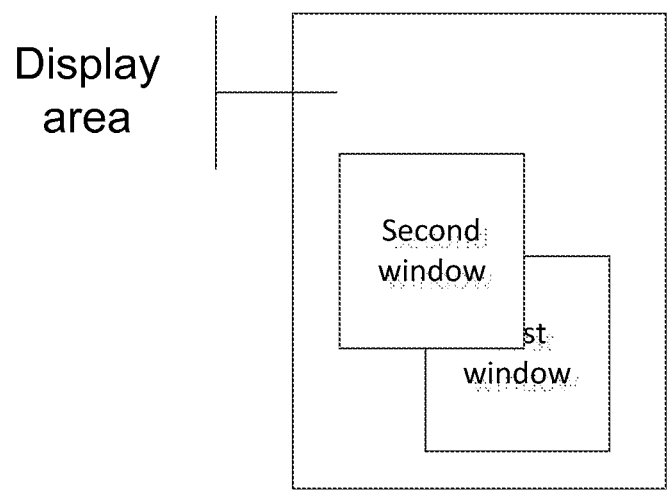
FIG. 6B is a diagram of display of two windows on a display unit in a second manner according to an embodiment of the present disclosure.

Specifically, with reference to FIG. 6B, illustrated is a diagram of display of two windows on a display unit in a second manner according to an embodiment of the present disclosure. As shown in FIG. 6B, the first window and the second window which have a part of overlapped area are displayed on the display unit. Contents corresponding to the second window are displayed in the overlapped area.

For ease of description of the technical solution in the embodiment of the present disclosure, the present embodiment is merely described by taking two windows corresponding to two applications as an example. In practical applications, the display unit of the smart phone may display three or more windows, and the process of adjusting these windows is similar to the process of adjusting two windows. For clarity of the specification, the description thereof will be omitted.

Further, in a specific implementation, in addition to the multi-window display mode illustrated in FIGS. 6A and 6B, there is also a single-window display mode for the display unit of the smart phone. In the multi-window display mode as shown in FIGS. 6A and 6B, the smart phone may display contents corresponding to two windows on the display unit at the same time, and the contents corresponding to three or more windows may also be displayed on the display unit. In the single-window display mode, when a window corresponding to a certain application is displayed on the display unit of the smart phone, the window is displayed in a full screen, and the smart phone will only display a window corresponding to one application on the display unit at the same time. It is more convenient to apply the information processing method according to the present embodiment to the electronic device in a single-window display mode.

Figure 7:
FIG. 7 is a Z-order diagram of a display unit of an electronic device in a single-window display mode according to an embodiment of the present disclosure.

Specifically, with reference to FIG. 7, illustrated is a Z-order diagram of a display unit of an electronic device in a single-window display mode according to an embodiment of the present disclosure. The Z-order is an order of arrangement of windows displayed on the display unit with a direction perpendicular to a plane where the display unit is located as an axis. As shown in FIG. 7, when the content corresponding to the first window is displayed on the display unit of the smart phone, the first content displayed on the smart phone may be adjusted according to the adjustment manner as described in the first embodiment. It should be noted FIG. 7 shows the position relationship among the first window, the second window and the display unit schematically. Those skilled persons in the art may understand the two windows are displayed on the display unit and the second window is displayed on a layer below that of the first window.

Conventionally, when changing the first content corresponding to the first window currently displayed on the display unit of the electronic device in a single-window display mode to the second content corresponding to the second window, it needs to return the first window which is displayed currently back to the desktop of the electronic device, and then open a second application corresponding to the second window, so as to adjust the contents corresponding to the first window which are displayed currently to the second content corresponding to the second window. Further, if a user only needs to view a part of data in the second content and wants to switch back to the first content, it further needs to exit the second window to return back to the desktop of the electronic device and then open the first application, so that the electronic device can display the contents corresponding to the first window on the display unit.

Compared with the conventional adjustment manner, according to the adjustment manners of the embodiments, the user only needs to control the electronic device to deform correspondingly, regardless whether the first content or the second content is displayed on the display unit of the electronic device. Therefore, it is convenient to operate and can save a large amount of time for a user, thereby enhancing user experience of the electronic device. The adjustment manners will be described below respectively.

As described in the first embodiment, there are at least the following three adjustment manners.

In the first manner, with reference to FIGS. 3-7, when the smart phone determines, based on the acquired deformation parameter, that there is a change in an angle between a first plane corresponding to a first part and a second plane corresponding to a second part, preferably, in order to avoid mis-operation of a user, when the change in the angle between the first plane and the second plane is larger than a first threshold, it is determined that the smart phone deforms. When it is determined that the smart phone deforms, the content displayed on the display unit is adjusted from the first content to the second content. Specifically, the first content corresponding to the first window on the display unit is adjusted to the second content corresponding to the second window.

For example, by taking a document window as the first window and a webpage window as the second window as an example, when the smart phone determines that the there is a change in the angle between the first plane and the second plane, preferable, when the change in the angle between the first plane and the second plane is larger than the first threshold such as 30°, 45° etc., the document window displayed on the display unit is switched to the webpage window.

In a second manner, with reference to FIGS. 3-7, when the smart phone determines, based on the acquired deformation parameter, that a change in an angle between a first plane corresponding to a first part and a second plane corresponding to a second part changes from more than a first threshold to less than a second threshold, the contents displayed on the display unit are adjusted from the first content to the second content. The first threshold may be larger than the second threshold.

In an example, by taking a document window as the first window and a webpage window as the second window as an example, when the smart phone determines, based on the acquired deformation parameter, that the change in the angle between the first plane and the second plane changes from more than 60° to less than 30°, i.e., the deformation of the smart phone is from being bent to being recovered (i.e., unbent), the document window displayed on the display unit is switched to the webpage window.

In a third manner, with reference to FIGS. 3-7, firstly, when the smart phone determines, based on the acquired deformation parameter, that there is a change in the angle between the first plane corresponding to the first part of the smart phone and the second plane corresponding to the second part, the first content corresponding to the first window displayed on the display unit is adjusted to the second content corresponding to the second window. This step is similar to that of the first adjustment manner, and the description thereof will be omitted here. Then, a second deformation parameter corresponding to deformation of the smart phone due to the deformation continues to be acquired, and when the second deformation parameter indicates that the change in the angle between the first plane and the second plane changes from more than the first threshold to less than a second threshold, the smart phone can determine a control instruction which may be used for controlling the smart phone to adjust the second content corresponding to the second window displayed on the display unit to the first content corresponding to the first window.

For example, by taking a document window as the first window and a webpage window as the second window as an example, when the smart phone determines that there is a change in an angle between the first plane and the second plane, preferably, when the change in the angle between the first plane and the second plane is larger than the first threshold, the document window displayed on the display unit is switched to the webpage window. At this time, a user may need to correspondingly view some information such as some important digits etc. in the webpage window when viewing the contents in the document window, and the document window is temporarily switched to the webpage window. Of course, if material of the position where the smart phone deforms is a memory material, for example, a material which may automatically be recovered to a state before the deformation when an external force is removed, a user needs to maintain the state in which the smart phone deforms, for example, a corner of the smart phone is bent with a finger all the time etc. When the user views the information in the webpage window, if the material of the position where the smart phone deforms is the memory material as described above, the user only needs to loose his/her finger. If the material of the position where the smart phone deforms is not the memory material, the user needs to recover the deformed smart phone to a state in which the smart phone is not deformed. The smart phone can determine, based on the deformation parameter, that the change in the angle between the first plane and the second plane changes from more than the first threshold to less than the second threshold, thereby switching the webpage window displayed on the display unit back to the document window.

In particular, in a single-window display mode, the second window is not necessarily a window corresponding to an application program which has been executed, and instead, the second window may also be a window corresponding to a preset application. For example, the first window is a document window, and it only needs to specifically set the preset application, for example, a clock application. When the smart phone determines, based on the acquired deformation parameter, that the change in the angle between the first plane and the second plane is larger than the first threshold, the document window displayed on the display unit can be switched to a window corresponding to the clock application, thereby being convenient for a user to view the time. When the document window is switched to the window corresponding to the clock application, when the smart phone determines, based on the acquired deformation parameter, that the change in the angle between the first plane and the second plane changes from more than the first threshold to less than the second threshold, the window corresponding to the clock application displayed on the display unit can be switched to the document window, so that the user may operate continuously. It can be seen that in such case, a user can make the smart phone deform, to adjust the first content displayed on the display unit to a preset second content. When the smart phone is recovered to a state before the deformation, the second content displayed on the display unit can further be adjusted to the first content conveniently.

Similar to the adjustment manner as described in the first embodiment, the control instruction may also be determined based on the first deformation parameter according to the specific process when the smart phone deforms, so as to meet requirements of a user in different usage scenarios. The description thereof will be omitted here.

According to the present embodiment, a first deformation parameter corresponding to deformation of a deformable electronic device is acquired when the first content is displayed on the display unit of the electronic device, a control instruction is determined based on the first deformation parameter, and the second content is displayed on the display unit based on the control instruction, the first content is different from the second content. Therefore the deformable electronic device can adjust the contents displayed on the display unit according to the first deformation parameter corresponding to the deformation of the electronic device. That is, the deformable electronic device can correspondingly adjust the contents displayed on the display unit only by acquiring a deformation parameter corresponding to deformation of the electronic device. The adjustment process is implemented according to the deformable characteristics of the electronic device per se, and at the same time, the deformable electronic device can conveniently deform under an operation of a user.

Figure 8:
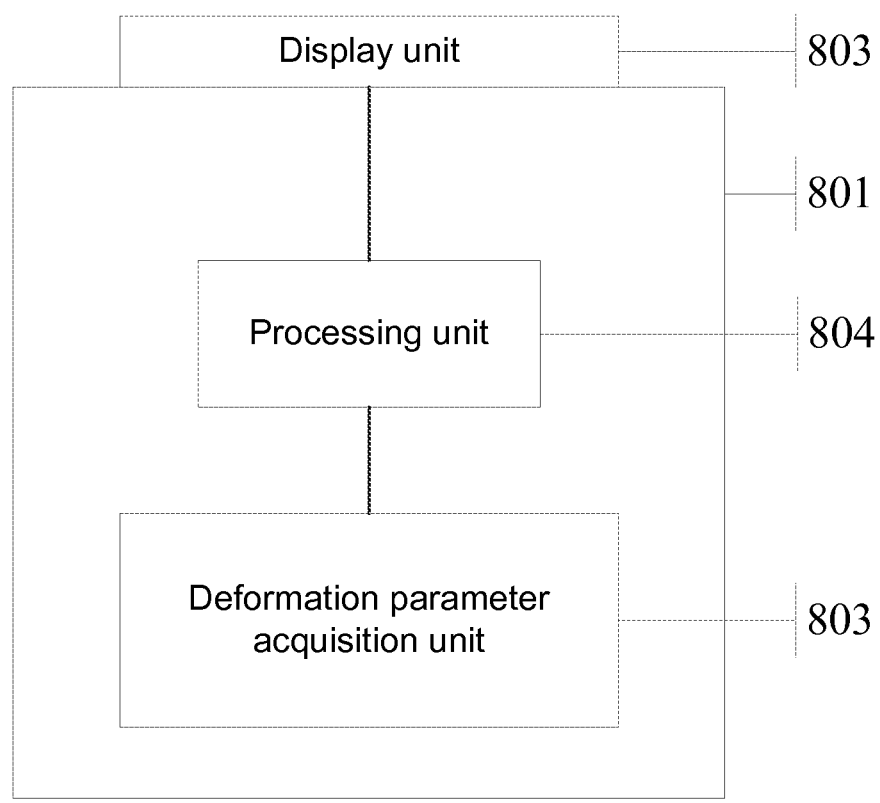
FIG. 8 is a modular diagram of an electronic device according to an embodiment of the present disclosure.

Based on the same inventive concept, the embodiments of the present disclosure further provide a deformable electronic device. With reference to FIG. 8, illustrated is a modular diagram of an electronic device according to an embodiment of the present disclosure. As shown in FIG. 8, the electronic device comprises:

a housing 801;
a display unit 802 arranged on the housing 801;
a deformation parameter acquisition unit 803 configured to acquire a first deformation parameter corresponding to deformation of the electronic device when a first content is displayed on the display unit 802; and
a processor 804 arranged in the housing 801 and connected to the display unit 802 and the deformation parameter acquisition unit 803, configured to determine a control instruction based on the first deformation parameter, and display a second content on the display unit 802 based on the control instruction, the first content being different from the second content.

In a specific implementation, the deformation parameter acquisition unit 803 comprises an array of sensors, and when the deformation of the electronic device is a change in a relative position of a first part of the electronic device with respect to a second part of the electronic device, the deformation parameter acquisition unit 803 is further configured to acquire, through the array of sensors, an angle parameter representing an angle between a first plane corresponding to the first part and a second plane corresponding to the second part or a position parameter representing a relative position of the deformation with respect to the electronic device when the electronic device deforms.

In a specific implementation, the display unit 802 is a deformable display unit which deforms in response to the deformation of the electronic device. The processor 804 is further configured to determine a first control instruction for generating a first identification corresponding to the first content based on the first deformation parameter, the first identification being used for locating the first content.

In a specific implementation, the display unit 802 is a deformable display unit which deforms in response to the deformation of the electronic device. Two windows corresponding to two respective applications are displayed on the display unit 802, with at least a part of overlapped area between the two windows. When the two windows are displayed in a first manner, contents corresponding to the first window of the two windows are displayed in the overlapped area. The processor 804 is further configured to determine a second control instruction for adjusting a display manner of the display unit 802 from the first manner to a second manner based on the first deformation parameter. When the two windows are displayed on the display unit 802 in the second manner, contents corresponding to the second window of the two windows are displayed in the overlapped area.

In a specific implementation, when the deformation of the electronic device is a change in an angle between a first plane corresponding to a first part of the electronic device and a second plane corresponding to a second part of the electronic device, and the first deformation parameter indicates that the change in the angle between the first plane and the second plane is larger than a first threshold, the processor 804 is further configured to determine a first control instruction for controlling the electronic device to display the second content on the display unit 802 based on the first deformation parameter.

In a specific implementation, the processor 804 is further configured to continue to acquire, by the deformation parameter acquisition unit 803, a second deformation parameter corresponding to deformation of the electronic device when the second content is displayed on the display unit 802 based on the first control instruction, and when the second deformation parameter indicates that the change in the angle between the first plane and the second plane changes from more than the first threshold to less than a second threshold, determine a second control instruction for controlling the electronic device to display the first content on the display unit 802.

In a specific implementation, the processor 804 is further configured to adjust a display area of the display unit 802 from a first display area to a second display area based on the first control instruction when the second content is displayed on the display unit 802 based on the first control instruction. The second display area is matched with the deformation.

In a specific implementation, the processor 804 is further configured to adjust a display area of the display unit 802 from a first display area to a second display area based on the control instruction when the second content is displayed on the display unit 802 based on the control instruction. The second display area is matched with the deformation.

In a specific implementation, the processor 804 is further configured to determine a control instruction based on the first deformation parameter when the deformation of the electronic device is a change in an angle between a first part of the electronic device and a second part of the electronic device by determining the control instruction when the first deformation parameter indicates that the change in the angle between the first part and the second part changes from more than a third threshold to less than a fourth threshold.

According to the embodiments, the adjustment process is implemented according to the deformable characteristics of the electronic device, and at the same time, the deformable electronic device can conveniently deform under an operation of a user. Therefore, the adjustment manner of the information processing method according to an embodiment of the present disclosure simplifies the operation in the conventional adjustment manner.

The electronic device according to the present embodiment and the information processing method according to the above embodiment are two aspects under the same inventive concept. Based on the implementations of the methods described in detail above, those skilled in the art can clearly understand the structure and implementations of the electronic device according to the present embodiment based on the above description. For conciseness of the specification, the description thereof will be omitted here.

Those skilled in the art should appreciate that the embodiments of the present disclosure can be provided as methods, systems, or computer program products. Therefore, forms such as hardware-only embodiments, software-only embodiments, or embodiments combining software and hardware can be used in the present disclosure. In addition, forms such as a computer program product which is implemented on one or more of computer usable storage media (comprising but not limited to a disk memory, a CD-ROM, an optical memory etc.) with computer usable program codes can be used in the present disclosure.

The present disclosure is described with reference to the flowcharts and/or cover diagrams of the methods, devices (systems) and computer program products according to the embodiments of the present disclosure. It should be understood that each flow and/or cover in the flowcharts and/or cover diagrams as well as a combination of the flows and/or cover in the flowcharts and/or cover diagrams can be implemented by computer program instructions. These computer program instructions can be provided to a processor of a general-purpose computer, a dedicated-purpose computer, an embedded processor, or other programmable data processing devices to generate a machine. Thereby, the instructions executed by the processor of the computer or other programmable data processing devices generate means for implementing functions specified in one or more flows in the flowcharts and/or one or more covers in the cover diagrams.

These computer program instructions can also be stored in a computer readable memory capable of introducing a computer or other programmable data processing devices to operate in a particular mode. Thereby, the instructions stored in the computer readable memory generate an article of manufacture comprising instruction means for implementing functions specified in one or more flows in the flowcharts and/or one or more covers in the cover diagrams.

These computer program instructions can also be loaded onto a computer or other programmable data processing devices, so as to enable a series of operation steps to be performed on the computer or other programmable devices to generate a computer-implemented process. Thereby, the instructions executed on the computer or other programmable devices provide a step of implementing functions specified in one or more flows in the flowcharts and/or one or more covers in the cover diagrams.

Specifically, computer program instructions corresponding to the information processing method according to the embodiments of the present disclosure may be stored on a storage medium such as an optical disk, a hard disk, a USB device etc. When the computer program instructions in the storage medium corresponding to the information processing method are read and executed by an electronic device, comprising steps of:

acquiring a first deformation parameter corresponding to deformation of the electronic device when a first content is displayed on a display unit;

determining a control instruction based on the first deformation parameter; and displaying a second content on the display unit based on the control instruction, the first content being different from the second content.

Alternatively, when the deformation of the electronic device is a change in a relative position of a first part of the electronic device with respect to a second part of the electronic device, a storage medium further stores other computer instructions, and when these computer instructions are executed:

acquiring an angle parameter representing an angle between a first plane corresponding to the first part and a second plane corresponding to the second part.

Alternatively, the storage medium further stores other computer instructions, and when these computer instructions are executed:

acquiring a position parameter representing a relative position of the deformation with respect to the electronic device when the electronic device deforms.

Alternatively, the display unit is a deformable display unit which deforms in response to the deformation of the electronic device. The storage medium further stores other computer instructions, and when these computer instructions are executed:

determining a first control instruction for generating a first identification corresponding to the first content based on the first deformation parameter, the first identification being used for locating the first content.

Alternatively, the display unit is a deformable display unit which deforms in response to the deformation of the electronic device. the storage medium further stores other computer instructions, which are executed when two windows corresponding to two respective applications are displayed on the display unit, with at least a part of overlapped area between the two windows, when the two windows are displayed in a first manner, contents corresponding to the first window of the two windows are displayed in the overlapped area, and when these computer instructions are executed:

determining a second control instruction for adjusting a display manner of the display unit from the first manner to a second manner based on the first deformation parameter, wherein when the two windows are displayed on the display unit in the second manner, contents corresponding to the second window of the two windows are displayed in the overlapped area.

Alternatively, the storage medium further stores other computer instructions, which are executed when the deformation of the electronic device is a change in an angle between a first plane corresponding to a first part of the electronic device and a second plane corresponding to a second part of the electronic device, and when these computer instructions are executed:

determining a third control instruction for controlling the electronic device to display the second content on the display unit when the first deformation parameter indicates that the change in the angle between the first plane and the second plane is larger than a first threshold.

Alternatively, the storage medium further stores other computer instructions, which are executed when displaying the second content on the display unit based on the third control instruction, and when these computer instructions are executed:

continuing to acquire a second deformation parameter corresponding to deformation of the electronic device due to the deformation; and determining a fourth control instruction for controlling the electronic device to display the first content on the display unit when the second deformation parameter indicates that the change in the angle between the first plane and the second plane changes from more than the first threshold to less than a second threshold.

Alternatively, the storage medium further stores other computer instructions, which are executed when displaying the second content on the display unit based on the third control instruction, and when these computer instructions are executed:

adjusting a display area of the display unit from a first display area to a second display area based on the third control instruction, wherein the second display area is matched with the deformation.

Alternatively, the storage medium further stores other computer instructions, which are executed when the deformation of the electronic device is a change in an angle between a first part of the electronic device and a second part of the electronic device, and when these computer instructions are executed:

determining the control instruction when the first deformation parameter indicates that the change in the angle between the first part and the second part changes from more than a third threshold to less than a fourth threshold.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. An information processing method applied in a deformable electronic device, the method comprising:

acquiring a first deformation parameter corresponding to deformation of the deformable electronic device at a specific position when a first content is displayed on a display unit provided in the deformable electronic device;

determining a control instruction based on the first deformation parameter; and displaying a second content on the display unit based on the control instruction, the first content being different from the second content, wherein when the deformable electronic device is deformed at the specific position to an extent that the amount of the deformation is not larger than a threshold and a second area corresponding to the deformation at the specific position does not cover a first area which is an area of the display unit except for the second area, the content displayed on the second area is maintained; and wherein when the deformable electronic device is deformed at the specific position to an extent that the amount of the deformation is larger than the threshold and the second area corresponding to the deformation at the specific position does not cover the first area, only a content corresponding to the first content is displayed on the first area, wherein the deformation of the deformable electronic device is a change in a relative position of the second area with respect to the first area; and wherein when the deformable electronic device continues to be deformed at the specific position to an extent that the second area corresponding to the deformation at the specific position covers the first area, only a content corresponding to the first content is displayed on an area of the display unit except for the second area and except for a part of the first area which is covered by the second area.

2. The method according to claim 1, wherein acquiring a first deformation parameter corresponding to deformation of the deformable electronic device further comprises:

acquiring an angle parameter representing an angle between a first plane corresponding to the first part and a second plane corresponding to the second part, when the deformation of the deformable electronic device is a change in a relative position of a first part of the deformable electronic device with respect to a second part of the deformable electronic device.

3. The method according to claim 1, wherein acquiring a first deformation parameter corresponding to deformation of the deformable electronic device further comprises:

acquiring a position parameter representing a relative position of the deformation with respect to the deformable electronic device when the deformable electronic device deforms.

4. The method according to claim 1, wherein the display unit is a deformable display unit which deforms in response to deformation of the electronic device, and determining a control instruction based on the first deformation parameter further comprises:

determining a first control instruction for generating a first identification corresponding to the first content based on the first deformation parameter, the first identification being used for locating the first content.

5. The method according to claim 1, wherein the display unit is a deformable display unit which deforms in response to deformation of the electronic device, two windows associated to two respective applications are displayed on the display unit with at least a part of overlapped area between the two windows, and determining a control instruction based on the first deformation parameter further comprises:

determining a second control instruction for adjusting a display manner of the display unit from the first manner to a second manner based on the first deformation parameter when the two windows are displayed in a first manner, contents corresponding to the first window of the two windows are displayed in the overlapped area, wherein when the two windows are displayed on the display unit in the second manner, contents corresponding to the second window of the two windows are displayed in the overlapped area.

6. The method according to claim 1, wherein determining a control instruction based on the first deformation parameter further comprises:

when the deformation of the electronic device is a change in an angle between a first plane corresponding to a first part of the electronic device and a second plane corresponding to a second part of the electronic device, determining a third control instruction for controlling the electronic device to display the second content on the display unit in the case that the first deformation parameter indicates that the change in the angle between the first plane and the second plane is larger than a first threshold.

7. The method according to claim 6, further comprising, when displaying the second content on the display unit based on the third control instruction:

continuing to acquire a second deformation parameter corresponding to deformation of the electronic device; and determining a fourth control instruction for controlling the electronic device to display the first content on the display unit when the second deformation parameter indicates that the change in the angle between the first plane and the second plane changes from more than the first threshold to less than a second threshold.

8. The method according to claim 6, further comprising:

adjusting a display area of the display unit from a first display area to a second display area based on the third control instruction, wherein the second display area is matched with the deformation when displaying the second content on the display unit based on the third control instruction.

9. The method according to claim 1, wherein determining a control instruction based on the first deformation parameter further comprises:

when the deformation of the electronic device is a change in an angle between a first plane corresponding to a first part of the electronic device and a second plane corresponding to a second part of the electronic device, determining the control instruction in the case that the first deformation parameter indicates that the change in the angle between the first plane and the second plane changes from more than a third threshold to less than a fourth threshold.

10. A deformable electronic device, comprising:

a housing;

a display unit arranged on the housing;

an array of sensors configured to acquire a first deformation parameter corresponding to deformation of the electronic device at a specific position when a first content is displayed on the display unit; and a processor arranged in the housing and connected to the display unit and the array of sensors, configured to determine a control instruction based on the first deformation parameter, and display a second content on the display unit based on the control instruction, the first content being different from the second content, wherein when the deformable electronic device is deformed at the specific position to an extent that the amount of the deformation is not larger than a threshold and a second area corresponding to the deformation at the specific position does not cover a first area which is an area of the display unit except for the second area, the content displayed on the second area is maintained, and wherein when the deformable electronic device is deformed at the specific position to an extent that the amount of the deformation is larger than the threshold and the second area corresponding to the deformation at the specific position does not cover the first area, only a content corresponding to the first content is displayed on the first area, wherein the deformation of the deformable electronic device is a change in a relative position of the second area with respect to the first area; and wherein when the deformable electronic device continues to be deformed at the specific position to an extent that the second area corresponding to the deformation at the specific position covers the first area, only a content corresponding to the first content is displayed on an area of the display unit except for the second area and except for a part of the first area which is covered by the second area.

11. The electronic device according to claim 10, wherein the array of sensors are further configured to:

when the deformation of the electronic device is a change in a relative position of a first part of the electronic device with respect to a second part of the electronic device, acquire an angle parameter representing an angle between a first plane corresponding to the first part and a second plane corresponding to the second part or a position parameter representing a relative position of the deformation with respect to the electronic device while the electronic device deforms.

12. The electronic device according to claim 10, wherein the processor is further configured to determine a first control instruction for controlling the electronic device to display the second content on the display unit based on the first deformation parameter, when the deformation of the electronic device is a change in an angle between a first plane corresponding to a first part of the electronic device and a second plane corresponding to a second part of the electronic device, and the first deformation parameter indicates that the change in the angle between the first plane and the second plane is larger than a first threshold.

13. The electronic device according to claim 12, wherein the processor is further configured to continue to acquire, by the array of sensors, a second deformation parameter corresponding to deformation of the electronic device when the second content is displayed on the display unit based on the first control instruction, and when the second deformation parameter indicates that the change in the angle between the first plane and the second plane changes from more than the first threshold to less than a second threshold, determine a second control instruction for controlling the electronic device to display the first content on the display unit.

14. The electronic device according to claim 12, wherein the processor is further configured to adjust a display area of the display unit from a first display area to a second display area based on the control instruction when the second content is displayed on the display unit based on the control instruction, wherein the second display area is matched with the deformation.

* * * * *